(12) United States Patent

Hama et al.

(10) Patent No.: US 8,034,512 B2
(45) Date of Patent: Oct. 11, 2011

(54) TUBULAR FUEL CELL WITH COIL CURRENT COLLECTOR

(75) Inventors: Yuichiro Hama, Nagoya (JP); Masaki Terada, Toyota (JP); Hirokazu Ishimaru, Toyota (JP); Yukihisa Katayama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 763 days.

(21) Appl. No.: 11/992,589

(22) PCT Filed: Sep. 22, 2006

(86) PCT No.: PCT/JP2006/319395
§ 371 (c)(1),
(2), (4) Date: Mar. 26, 2008

(87) PCT Pub. No.: WO2007/037351
PCT Pub. Date: Apr. 5, 2007

(65) Prior Publication Data
US 2009/0087714 A1    Apr. 2, 2009

(30) Foreign Application Priority Data

Sep. 27, 2005  (JP) ................. 2005-279167

(51) Int. Cl.
*H01M 4/64* (2006.01)
*H01M 8/02* (2006.01)
(52) U.S. Cl. .................. 429/517; 429/466; 429/497
(58) Field of Classification Search .................. None
See application file for complete search history.

(56) References Cited

U.S. PATENT DOCUMENTS

| 5,827,620 | A | * | 10/1998 | Kendall | 429/441 |
| 6,001,500 | A | * | 12/1999 | Bass et al. | 429/484 |
| 6,168,691 | B1 | | 1/2001 | Kauper et al. | |
| 6,974,516 | B2 | * | 12/2005 | Devoe et al. | 156/89.16 |
| 2004/0101742 | A1 | * | 5/2004 | Simpkins et al. | 429/44 |
| 2005/0008916 | A1 | * | 1/2005 | Okamoto et al. | 429/31 |
| 2005/0147857 | A1 | * | 7/2005 | Crumm et al. | 429/31 |
| 2006/0051642 | A1 | * | 3/2006 | Finnerty | 429/30 |

(Continued)

FOREIGN PATENT DOCUMENTS
EP    1 482 590 A1    1/2004
(Continued)

OTHER PUBLICATIONS
International Search Report.
(Continued)

*Primary Examiner* — Keith Walker
(74) *Attorney, Agent, or Firm* — Finnegan, Henderson, Farabow, Garrett & Dunner, LLP

(57) ABSTRACT

A fuel cell module that includes: a plurality of tubular fuel cells, each of which contains a cylindrically shaped inner electrode that exhibits conductivity, a first catalyst layer, an electrolyte layer, and a second catalyst layer laminated sequentially to the outer peripheral surface of the inner electrode, and an external coil that exhibits conductivity and is wound around the outer peripheral surface of the second catalyst layer in such a manner that a first coil section with a loose winding pitch is sandwiched between second coil sections with a tight winding pitch; and a current collecting member that exhibits conductivity and is provided with a plurality of openings into which the tubular fuel cells can be inserted, wherein the first coil sections and the openings fit together.

10 Claims, 9 Drawing Sheets

U.S. PATENT DOCUMENTS

2007/0148523 A1 * 6/2007 Brown et al. .................. 429/34

FOREIGN PATENT DOCUMENTS

| JP | 63-164941 | 10/1988 |
| --- | --- | --- |
| JP | 3-217044 | 9/1991 |
| JP | 5-101842 | 4/1993 |
| JP | 7-14593 | 1/1995 |
| JP | 8-507896 | 8/1996 |
| JP | 2000-75366 | 3/2000 |
| JP | 2000-516303 | 12/2000 |
| JP | 2001-35515 | 2/2001 |
| JP | 2002-127173 | 5/2002 |
| JP | 2002-313374 | 10/2002 |
| JP | 2002-367632 | 12/2002 |
| JP | 2004-356014 | 12/2004 |
| JP | 2005-135595 | 5/2005 |
| WO | WO 96/04690 | 2/1996 |

OTHER PUBLICATIONS

Written Opinion of the ISR.
Notice of Grounds for Rejection for JP Appl. No. 2005-279167 dated Jan. 15, 2011.

* cited by examiner (a)

(b)

(a)

(b)

(a)

(b)

TUBULAR FUEL CELL WITH COIL CURRENT COLLECTOR

TECHNICAL FIELD

The present invention relates to a tubular fuel cell module, and more particularly to a tubular fuel cell module in which the current collector electrodes of the fuel cells also function as spacers between the fuel cells.

BACKGROUND ART

As shown in the cross-sectional view along the lengthwise direction of the tube shown in FIG. 12, a conventional tubular fuel cell includes an inner electrode 10, a first catalyst layer 12, an electrolyte layer 14, a second catalyst layer 16, and a resin seal 20. FIG. 13 shows a cross-sectional view along the line A-A shown in FIG. 12. As shown in FIG. 13, the inner electrode 10, the first catalyst layer 12, the electrolyte layer 14, and the second catalyst layer 16 are laminated in sequence from the inside out, and are formed as substantially concentric circular cylinders.

In this type of tubular fuel cell, as shown in FIG. 12 and FIG. 13, an external coil 18 that exhibits conductivity is generally wound around the outer periphery of the second catalyst layer 16 with substantially no gaps, and the inner electrode 10 and the external coil 18 are connected electrically via an external circuit. For example, National Stage Laid-Open No. Hei 08-507896 discloses a tubular fuel cell comprising a helically wound wire around the outer periphery of the external electrode, wherein that wire is connected electrically to an arbitrary external circuit.

Conventionally, when a plurality of tubular fuel cells are combined to form a module, in order to ensure that the fuel gas or oxidizing gas is supplied as evenly as possible to each of the cells, and that the heat generated during the reaction is able to be cooled effectively, it is preferable that each cell is positioned with a predetermined separation from adjacent cells, while at the same time, the inner electrodes and external coils of the plurality of cells within the module must be respectively connected in parallel using current collecting line.

In order to dispense with the requirement of connecting the current collecting line, Japanese Patent Laid-Open Publication No. 2002-313374 discloses a technique in which an aperture that is slightly smaller than the cell tube diameter is formed in the exhaust-side metal tube plate, so that when the cell tube is passed through the aperture, the inner periphery of the aperture deforms, securing the tube. Furthermore, Japanese Patent Laid-Open Publication No. 2004-356014 discloses a modularization method in which the end portions (the inner electrodes) of a plurality of single cells are connected to a single metal plate using a combination of engagement and welding, thereby achieving current collection, while current collection of the external electrodes is achieved through contact with a cylindrical current collecting member.

However, with these conventional techniques, during the connection of the tubular fuel cell single cells and the current collector, although the effort associated with conducting connection via welding or the like is removed, because of the increase in the number of components and the effort required to complete the connection and associated processing, the overall result is not necessarily a reduction in costs, but is rather an impediment to the low cost production of fuel cell modules.

On the other hand, if a cylindrical current collecting member or the like is used to dispense with the effort associated with the use of a current collecting line or the like, then there is a danger of a significant increase in the size of the apparatus.

Particularly in those cases where between several thousand and several tens of thousands of very fine tubular fuel cells with diameters of several mm are grouped together and modularized with a spacing of several mm between cells, conducting the electrical connection between the modularized cells using current collecting line or the like requires highly precise processing technology as well as considerable time. As a result, the production process for the fuel cell module is complex and difficult, causing significant increases in the production costs.

DISCLOSURE OF INVENTION

A tubular fuel cell module of the present invention comprises a plurality of tubular fuel cells that each include a catalyst layer and an electrolyte layer laminated to the outer peripheral surface of a cylindrically shaped inner electrode, and a current collecting member that exhibits conductivity and also functions as a spacer for the tubular fuel cells.

Furthermore, a tubular fuel cell module of the present invention comprises: a plurality of tubular fuel cells, which each include a cylindrically shaped inner electrode that exhibits conductivity, a first catalyst layer, an electrolyte layer and a second catalyst layer laminated sequentially to the outer peripheral surface of the inner electrode, and an external coil that exhibits conductivity and is wound around the outer peripheral surface of the second catalyst layer in such a manner that a first coil section with a loose winding pitch is sandwiched between second coil sections with a tight winding pitch; and a current collecting member that exhibits conductivity and is provided with a plurality of openings into which the tubular fuel cells can be inserted, wherein the first coil sections and the openings fit together.

Furthermore, a tubular fuel cell module of the present invention comprises: a plurality of tubular fuel cells, which each include a cylindrically shaped inner electrode that exhibits conductivity, a first catalyst layer, an electrolyte layer and a second catalyst layer laminated sequentially to the outer peripheral surface of the inner electrode, and an external coil that exhibits conductivity and is wound around the outer peripheral surface of the second catalyst layer in such a manner that a first coil section with a first outer peripheral diameter is sandwiched between second coil sections with a second outer peripheral diameter that is larger than the first outer peripheral diameter; and a current collecting member that exhibits conductivity and is provided with a plurality of openings into which the tubular fuel cells can be inserted, wherein the first coil sections and the openings fit together.

In the above tubular fuel cell module, the inner peripheral diameter of the openings when the tubular fuel cells have been fitted within the openings is preferably larger than the outer peripheral diameter of the second catalyst layer, but smaller than the outer peripheral diameter of the second coil sections.

Furthermore, in the above tubular fuel cell module, the current collecting member preferably comprises insertion portions having a plurality of slits that extend radially outward in an in-plane direction from the center, and the tubular fuel cells are inserted in a manner that causes the plurality of slits of the insertion portions to curve or bend, thereby securing the tubular fuel cells to the current collecting member.

In the above tubular fuel cell module, the current collecting member is preferably a flexible member in which a plurality of insertion portions has been provided, and the tips of the inner electrodes are preferably secured by insertion into these insertion portions.

Furthermore, in a tubular fuel cell module of the present invention, by inserting the tubular fuel cells, the plurality of slits provided within the insertion portions preferably undergo deformation, thereby forming the aforementioned openings.

Furthermore, in the above tubular fuel cell module, the insertion portions are preferably provided in such a manner that at least the second catalyst layers of the plurality of tubular fuel cells do not contact each other.

BEST MODE FOR CARRYING OUT THE INVENTION

As follows is a description of embodiments of the present invention, based on the appended drawings.

In order to integrate a plurality of tubular fuel cells together to form a tubular fuel cell module, current collection must be conducted by connecting together all the external coils and all the inner electrodes respectively. In the following description, current collection from the external coils and current collection from the inner electrodes are dealt with separately.

Figure 1:
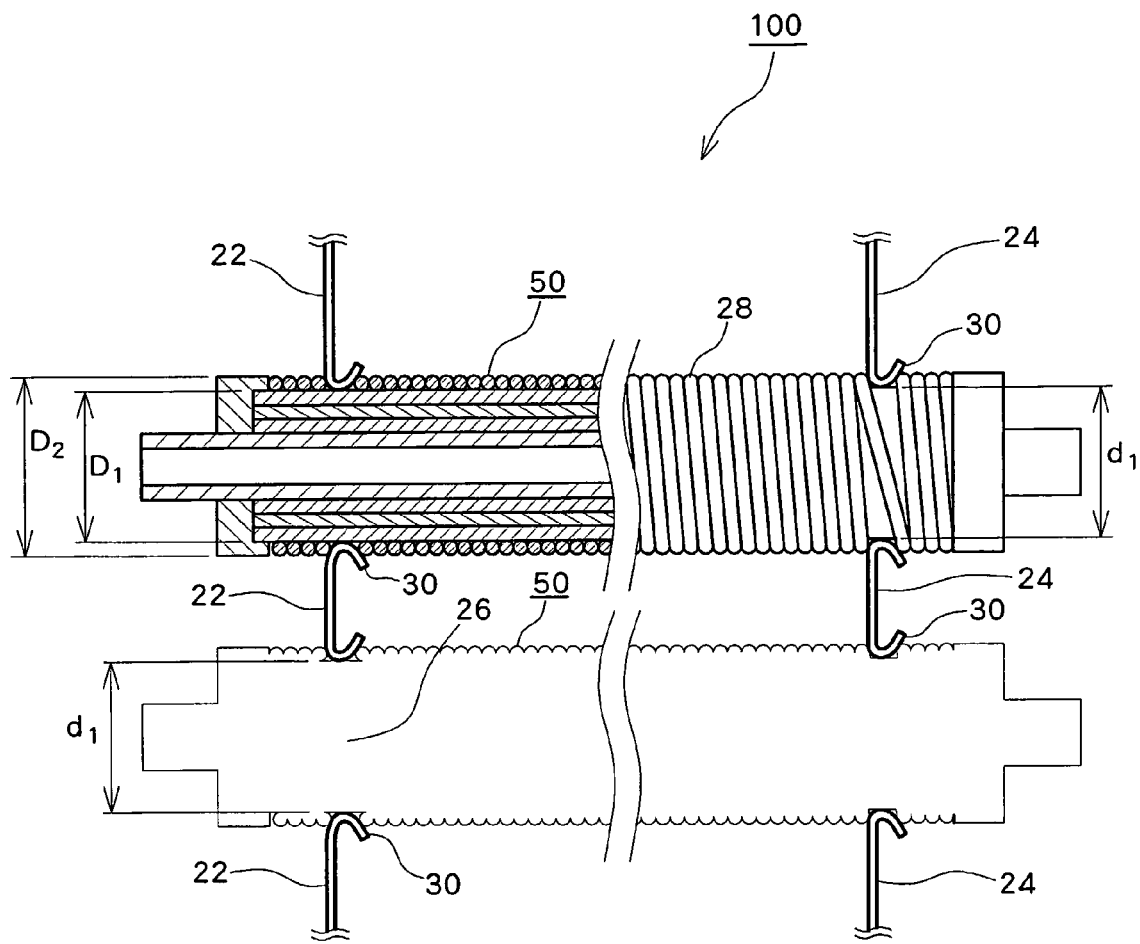
FIG. 1 is a side view showing an outline of the structure of a tubular fuel cell module 100 according to an embodiment of the present invention.

FIG. 1 is a side view showing an outline of the structure of a tubular fuel cell module 100 according to an embodiment of the present invention, which is formed using a plurality of tubular fuel cells 50 and current collecting members 22 and 24.

Figure 2:
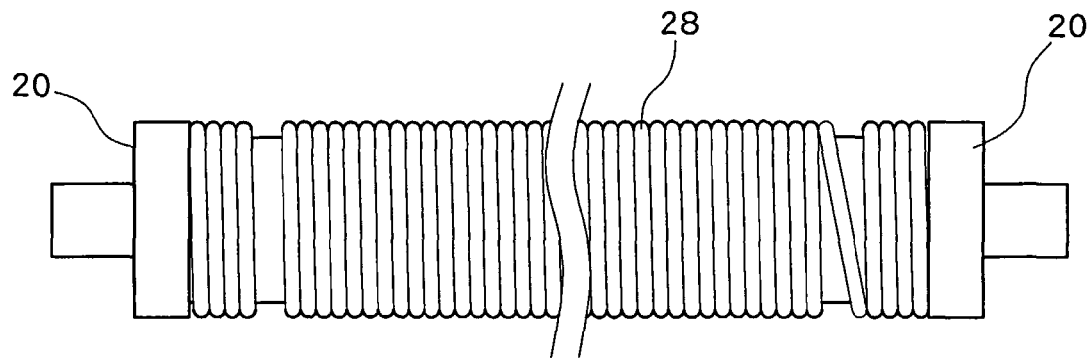
FIG. 2 is a diagram showing an outline of the structure of a tubular fuel cell shown in FIG. 1.
Figure 3:
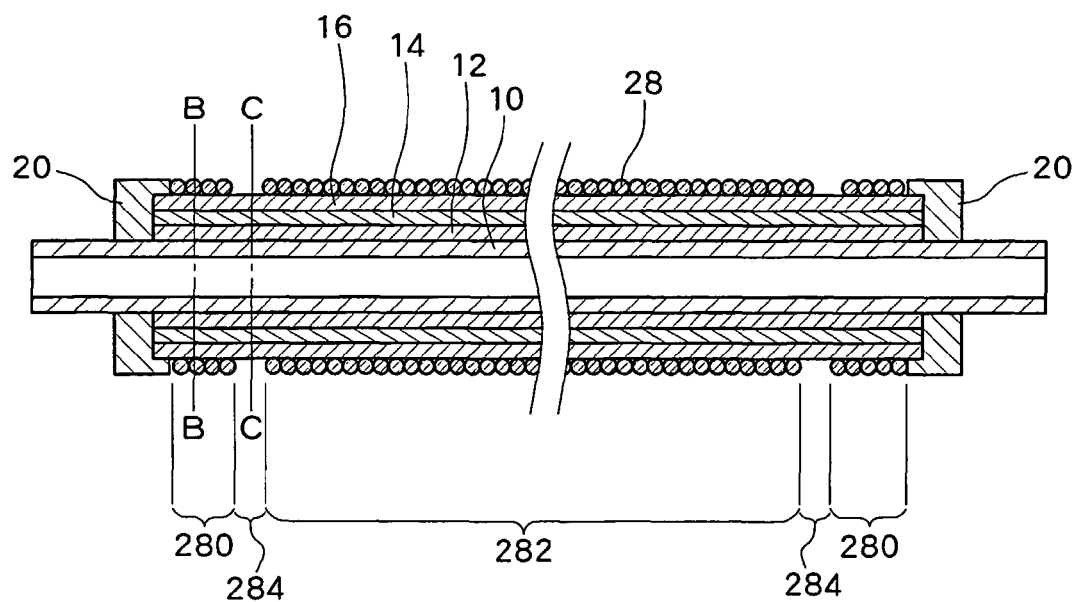
FIG. 3 is a cross-sectional view along the lengthwise direction of the tube of the tubular fuel cell shown in FIG. 2.
Figure 12:
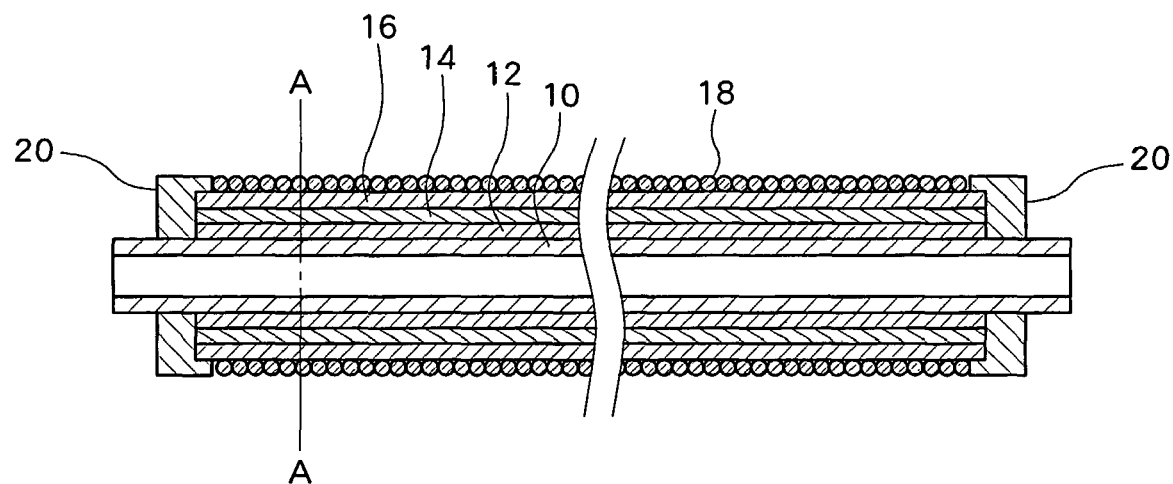
FIG. 12 is a cross-sectional view along the lengthwise direction of the tube of a conventional tubular fuel cell.
Figure 13:
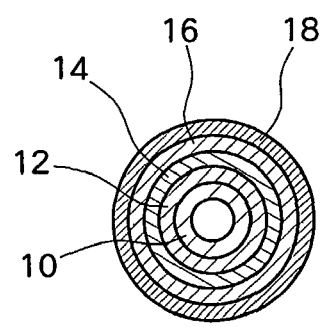
FIG. 13 is a cross-sectional view along the line A-A for the tubular fuel cell shown in FIG. 12.

FIG. 2 is a diagram showing an outline of the structure of the tubular fuel cell 50 shown in FIG. 1. Furthermore, FIG. 3 is a cross-sectional view along the lengthwise direction of the tube of the tubular fuel cell 50 shown in FIG. 2. With the exception of replacing the external coil 18 with an external coil 28, the structure of this fuel cell is substantially the same as the structure of the conventional tubular fuel cell shown in FIGS. 12 and 13.

Figure 4:
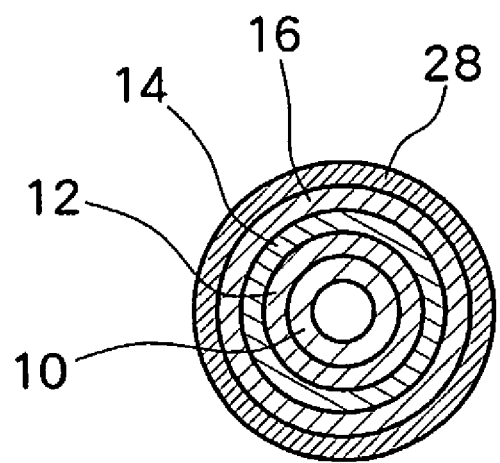
FIG. 4 is a cross-sectional view along the line B-B for the tubular fuel cell shown in FIG. 3.

The external coil 28 has sections 280 and 282 with a tight winding pitch, and sections 284 with a loose winding pitch, and the sections 284 with a loose winding pitch are sandwiched between the sections 280 and 282 with a tight winding pitch. FIG. 4 shows a cross-sectional view along the line B-B through the section 280 with a tight winding pitch in FIG. 3, whereas FIG. 5 shows a cross-sectional view along the line C-C through the section 284 with a loose winding pitch in FIG. 3.

Figure 5:
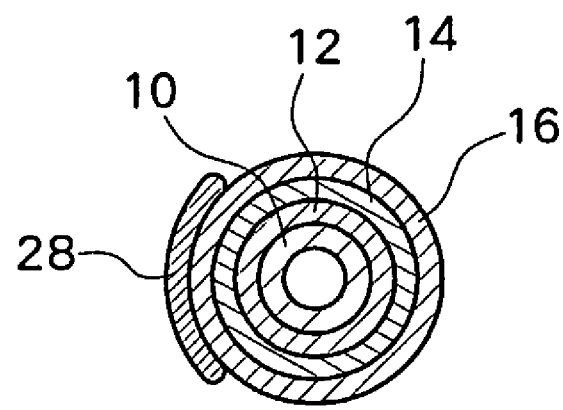
FIG. 5 is a cross-sectional view along the line C-C for the tubular fuel cell shown in FIG. 3.

As shown in FIG. 4 and FIG. 5, an inner electrode 10, a first catalyst layer 12, a electrolyte layer 14 and a second catalyst layer 16 are laminated in sequence from the inside out, in the form of substantially concentric circular cylinders, and the external coil 28 is then wound around the outer peripheral surface of the second catalyst layer 16. As shown in FIG. 5, the external coil 28 does not exist on the outer peripheral surface of the second catalyst layer 16 in at least a portion of the section 284 with a loose winding pitch, meaning a portion of the second catalyst layer 16 is exposed. As a result, the outer diameter of the portion within the section 284 with a loose winding pitch in which the second catalyst layer 16 is exposed is smaller than the outer diameter in the sections 280 and 282 with a tight winding pitch. In other words, as shown in FIG. 2 and FIG. 3, at least a portion of the section 284 with a loose winding pitch appears as an indentation relative to the sections 280 and 282 with a tight winding pitch.

In an embodiment of the present invention, the external coil 28 is preferably formed from a material such as gold, platinum, copper, stainless steel, titanium, or alloys containing such metals. In order to reduce the contact resistance, the coil may also be coated with appropriate gold plating or the like. The external coil 28 is of a thickness that enables winding around the tubular fuel cell. For example, an external coil 28 with a diameter that is approximately 10 to 30% of the outer diameter of the second catalyst layer 16 is ideal. More specifically, the diameter of the external coil 28 is preferably within a range from 0.5 to 5 mm, and even more preferably from 1.0 to 2.0 mm.

The current collecting members 22 and 24 are formed mainly from a material that exhibits favorable conductivity. Examples of the material that can be used include gold, platinum, copper, stainless steel, titanium, or alloys containing such metals. Furthermore, the surfaces of the current collecting members 22 and 24 are preferably subjected to plating treatment such as gold plating to further improve the conductivity. Furthermore, although the current collecting members 22 and 24 may be either the same or different, in order to limit the number of components, the same members are preferably used.

The current collecting members 22 and 24 are flexible plate-shaped members that extend perpendicularly from the plane of the paper in FIG. 1. Furthermore, the current collecting members 22 and 24 include a plurality of openings 26 into which tubular fuel cells 50 are able to be inserted.

The current collecting members 22 and 24 must also have the necessary rigidity required to enable formation of the tubular fuel cell module 100. Specifically, the thickness of the current collecting members 22 and 24 is preferably adjusted in accordance with factors such as the size, number, and weight of tubular fuel cells that are supported. The thickness of the current collecting members 22 and 24 is preferably adjusted with careful consideration of the balance needed between the rigidity required in the planar portions of the members, and the flexibility required in those portions that curve or bend.

For example, the thickness of the current collecting members 22 and 24 is preferably set within a range from 0.1 to 2.0 times the outer peripheral diameter $D_2$ of the external coil 28. More specifically, in those cases where the outer peripheral diameter $D_2$ of the external coil 28 is within a range from approximately several mm to several cm, and the number of tubular fuel cells used in forming a single module is within a range from approximately 10 to 50 cells, the thickness of the current collecting members 22 and 24 is preferably set to a value that is 0.1 to 2.0 times the value of the outer peripheral diameter $D_2$ of the external coil 28. For example, if the outer peripheral diameter $D_2$ of the external coil 28 is within a range from approximately 1.0 to 3.0 mm, then the thickness of the current collecting members 22 and 24 is preferably within a range from 0.1 to 6.0 mm.

The current collecting members 22 and 24 are positioned in a parallel arrangement with both members extending perpendicularly from the plane of the paper in FIG. 1. The openings 26 in the current collecting members 22 and 24 are provided in positions that line up when the current collecting members 22 and 24 are positioned facing one another. By inserting tubular fuel cells 50 through the openings 26 provided in the current collecting members 22 and 24 in a substantially perpendicular direction relative to the plane of the current collecting members 22 and 24, the fuel cells are supported in a manner in which the external coils 28 and edge portions 30 of the openings 26 make electrical contact. Accordingly, the electricity generated by each of the tubular fuel cells 50 can be collected.

As shown in FIG. 1, when a tubular fuel cell 50 is fitted within the openings 26 of the current collecting members 22 and 24, an inner peripheral diameter $d_1$ of the opening 26 is slightly larger than the outer peripheral diameter $D_1$ of the second catalyst layer 16. In a preferred configuration, the inner peripheral diameter $d_1$ is larger than the outer peripheral diameter $D_1$ of the second catalyst layer 16, but smaller than the outer peripheral diameter $D_2$ of the external coil 28. As a result, the tubular fuel cell 50 is supported in a stable manner relative to the current collecting members 22 and 24. In this description, the expression "outer peripheral diameter $D_2$ of the external coil 28" refers to the maximum dimension across the cross-sectional view of the tubular fuel cell 50 shown in FIG. 3 when the external coil 28 is wound around the cell, and in the case of a circular cylindrical tubular fuel cell, refers to the diameter of the cross section of the tubular fuel cell 50 including the thickness of the external coil 28.

Curving or bending the edge portions 30 of the openings 26 as shown in FIG. 1 is preferred, as it enables the contact surface area between the external coil 28 and the current collecting members 22 and 24 to be expanded, which improves the current collection performance, and enables the tubular fuel cell 50 to be supported in a more stable manner. Furthermore, because the tubular fuel cell 50 fits the edge portions 30, at least the edge portions 30 of the current collecting members 22 and 24 should preferably exhibit flexibility.

Figure 6:
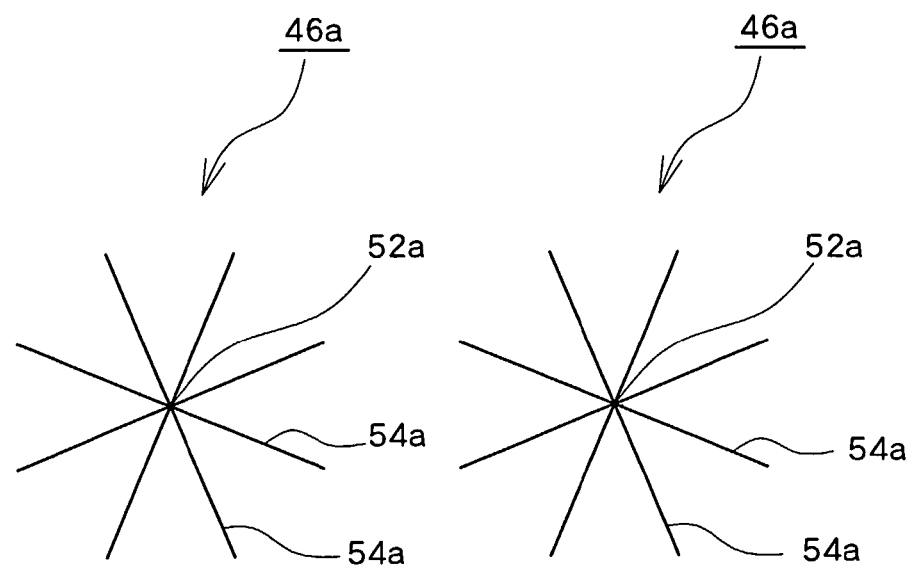
FIG. 6 is a set of diagrams showing a plate-like current collecting member 22 provided with insertion portions 46a, wherein (a) represents a schematic representation viewed within the plane of the plate, and (b) represents a cross-sectional view showing a state in which tubular fuel cells 50 have been inserted in the insertion portions.
Figure 6:
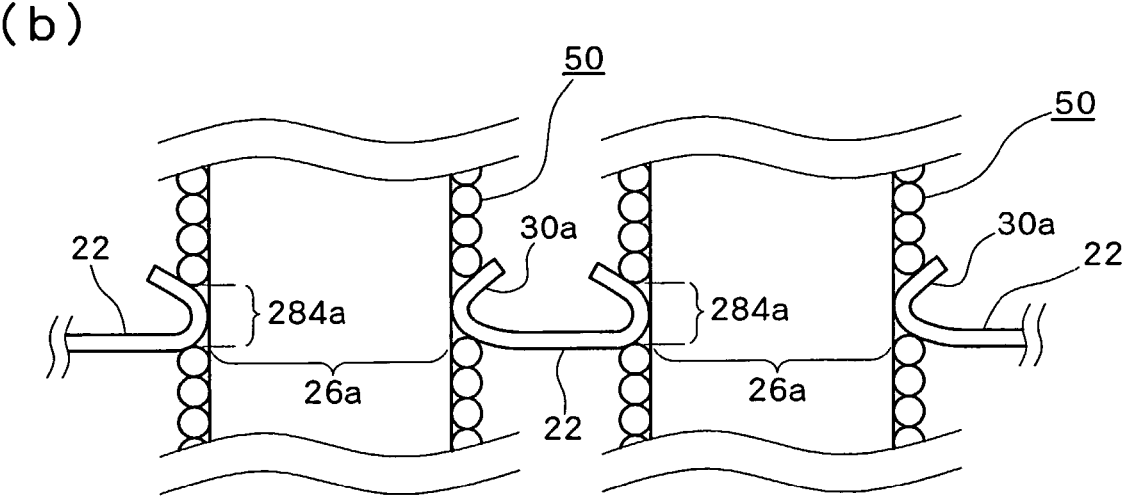

For example, by preparing plate-like current collecting members 22 and 24 with insertion portions 46a of the type shown in FIG. 6, openings 26 that have edge portions 30 with suitable flexibility can be obtained. FIG. 6 shows the shape of the insertion portions 46a when viewed from a substantially perpendicular direction relative to the plane of the plate-like current collecting members 22 and 24, that is, from the top surface or the rear surface of the plate.

The insertion portions 46a shown in FIG. 6(a) each comprise a plurality of slits 54a, which pass right through the current collecting member 22 or 24 from the top surface to the rear surface, and extend radially outward from a center portion 52a in an in-plane direction of the current collecting member 22 or 24. By inserting tubular fuel cells 50 through the insertion portions 46a of the current collecting members 22 and 24, the plurality of slits 54a curve or bend, thereby forming the openings 26a. If insertion of the tubular fuel cells 50 is then continued, then as shown in FIG. 6(b), those sections 284a with a loose winding pitch within the external coils provided on the tubular fuel cells 50 fit the edge portions 30a of the openings 26a. This fit enables a plurality of tubular fuel cells 50 to be secured to the current collecting members 22 and 24.

In the insertion portions 46a, the portions comprising the plurality of slits 54a that extend radially outward in an in-plane direction from a center portion 52a should be of sufficient size to enable the insertion of a tubular fuel cell 50. In other words, the diameter of the portion comprising the slits 54a is preferably larger than the outer peripheral diameter $D_2$ of the external coil 28 shown in FIG. 1. At the time of insertion of the tubular fuel cells 50, the flexibility of the slits 54a causes the inner peripheral diameter $d_1$ of the edge portions 30a of the openings 26a to expand to a size that is greater than the outer peripheral diameter $D_1$ of the second catalyst layer 16, but smaller than the outer peripheral diameter $D_2$ of the external coil 28. Furthermore, adjacent insertion portions 46a should be separated by a distance that ensures that adjacently secured tubular fuel cells 50 do not make contact with each other.

In this embodiment, the slits 54a are formed as eight equally-spaced slits with an angle of 45 degrees between adjacent slits, but the present invention is not restricted to this configuration, and any number of slits of three or above is acceptable. Furthermore, although the slits need not necessarily be formed with an equal spacing between adjacent slits, forming the slits with an approximately uniform angle between slits is preferred, as it enables a more even force to be applied to the tubular fuel cell 50. In addition, the length of the slits 54a may also be adjusted appropriately in accordance with the external shape of the tubular fuel cell 50. For example, in those cases where the second catalyst layer 16 of the tubular fuel cell 50 has an elliptically shaped cross section, the lengths of the slits 54a need not be equal, and are preferably set in accordance with the cross-sectional shape of the cell.

Figure 7:
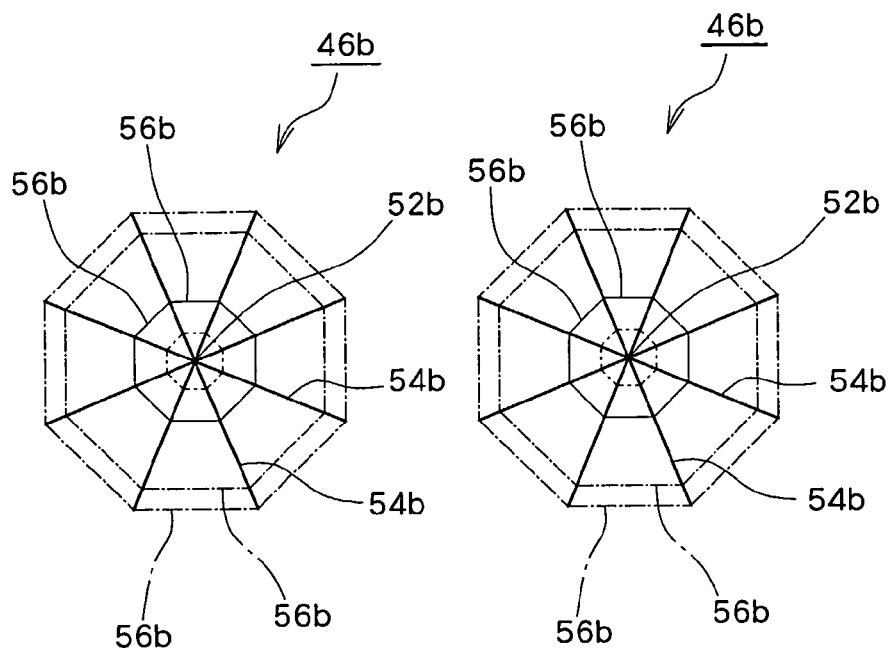
FIG. 7 is a set of diagrams showing a plate-like current collecting member 22 provided with insertion portions 46b, wherein (a) represents a schematic representation viewed within the plane of the plate, and (b) represents a cross-sectional view showing a state in which tubular fuel cells 50 have been inserted in the insertion portions.
Figure 7:
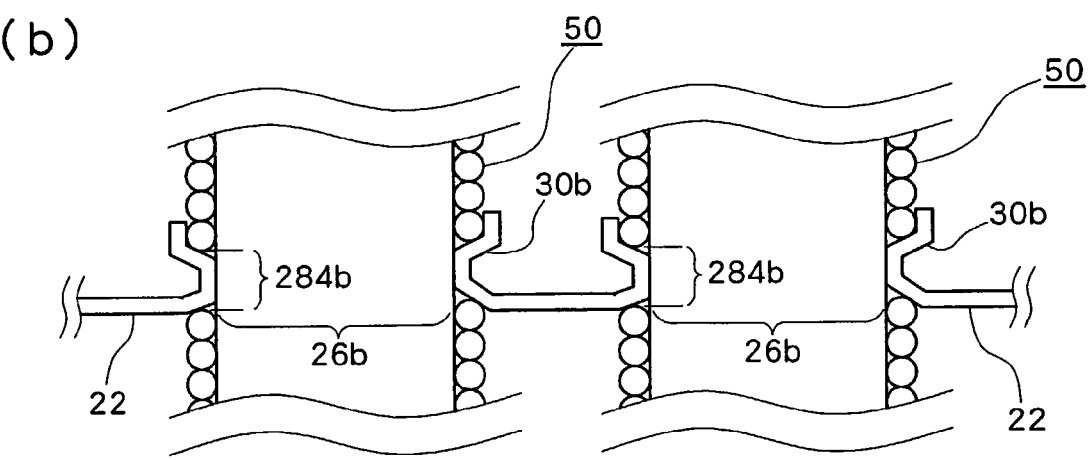
Figure 8:
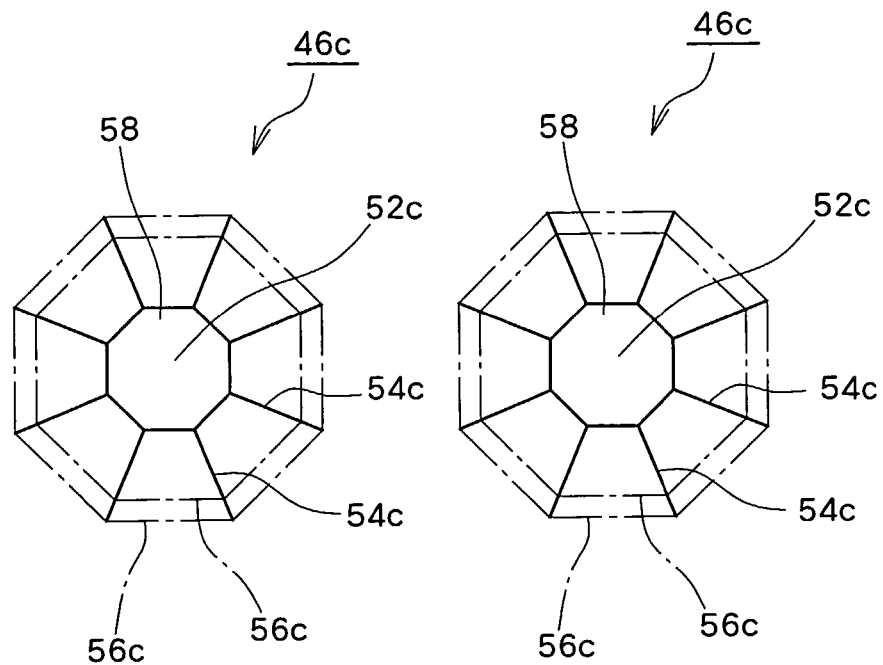
FIG. 8 is a set of diagrams showing a plate-like current collecting member 22 provided with insertion portions 46c, wherein (a) represents a schematic representation viewed within the plane of the plate, and (b) represents a cross-sectional view showing a state in which tubular fuel cells 50 have been inserted in the insertion portions.
Figure 8:
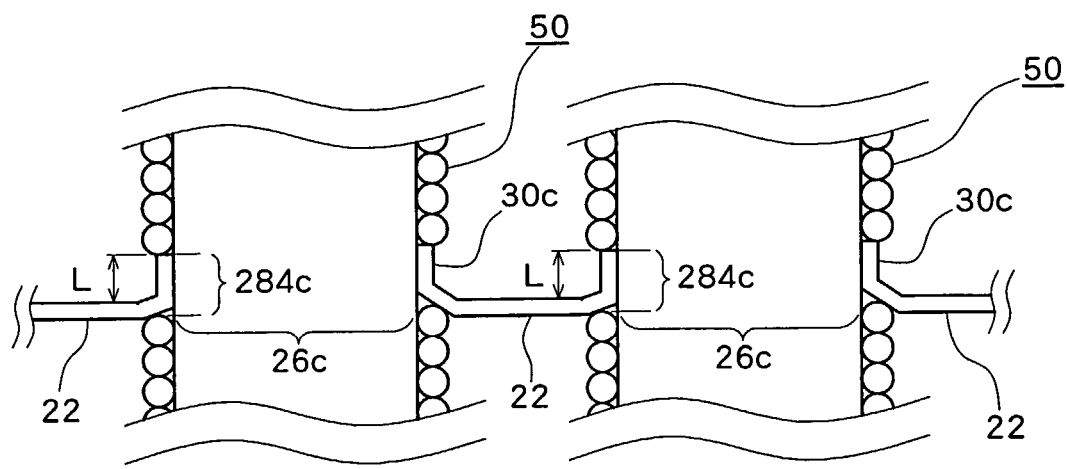

Furthermore, modified examples of the insertion portions are shown in FIG. 7 and FIG. 8. In a similar manner to FIG. 6, FIG. 7 and FIG. 8 show the shapes of insertion portions 46b and 46c respectively, when viewed from a substantially perpendicular direction relative to the plane of the plate-like current collecting members 22 and 24, that is, from the top surface or the rear surface of the plate.

The insertion portions 46b shown in FIG. 7(a) are similar to the insertion portions 46a shown in FIG. 6(a) in that each portion comprises a plurality of slits 54b that extend radially outward from a center portion 52b, but when the insertion portions 46b are formed, a series of grooves 56b that assist bending are also provided in the top surface and/or rear surface of the current collecting members 22 and 24. As shown in FIG. 7(a), a plurality of these grooves 56b are preferably provided concentrically around the center portion 52b. By providing grooves 56b in this manner, the insertion portions 46b within the current collecting members 22 and 24 can be readily bent. Accordingly, the tubular fuel cells 50 can be readily inserted through the insertion portions 46b.

The insertion portions 46c shown in FIG. 8(a) are similar to the insertion portions 46a shown in FIG. 6(a) in that each portion comprises a plurality of slits 54c that extend radially outward from a center portion 52c, but differ in terms of the fact that a hole 58 is provided at the center portion 52c where the slits intersect. If the height L of edge portions 30c in the direction of insertion of the tubular fuel cells 50 is set to a value substantially equal to the width of the indentation generated by sections 284c with a loose winding pitch, then the slits 54c will bend around the outer peripheral surface of the tubular fuel cells 50, thereby improving the closeness of the contact, and strengthening the fit, between the current collecting member 22 and the tubular fuel cells 50. The shape of the hole 58 need not necessarily be a regular polygon such as a regular octagon or the like, and for example, could also be circular.

Figure 9:
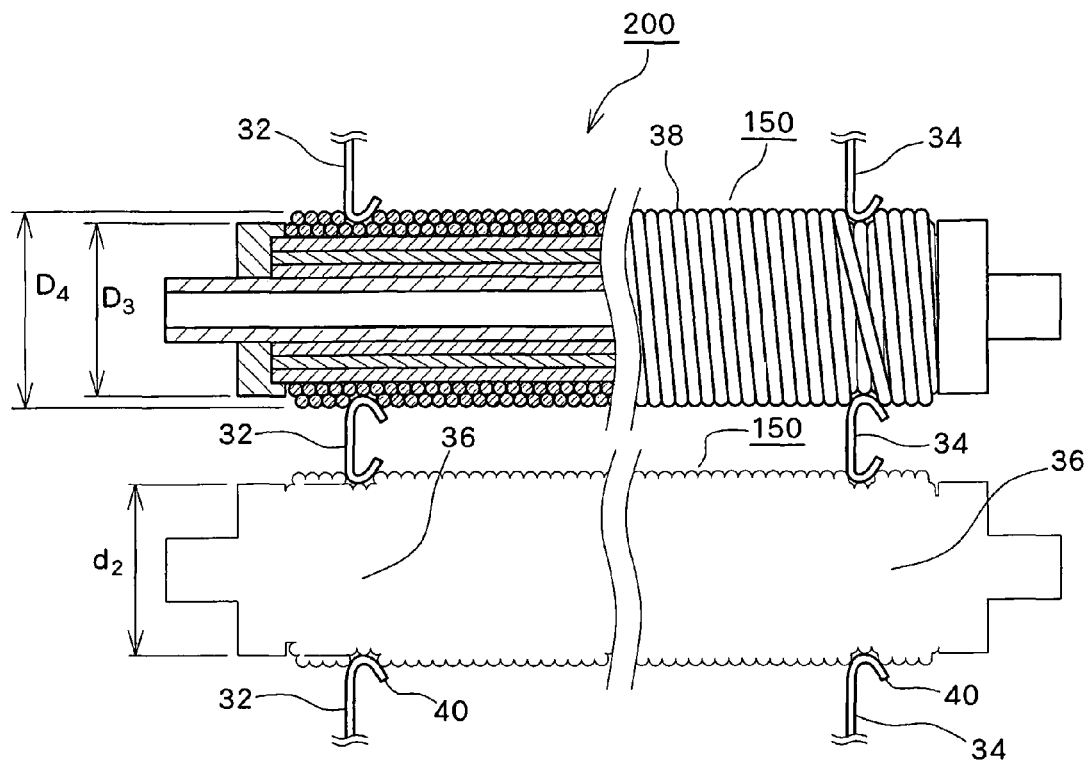
FIG. 9 is a diagram showing an outline of the structure of a tubular fuel cell module 200 according to another embodiment of the present invention.

FIG. 9 is a side view showing an outline of the structure of a tubular fuel cell module 200 according to another embodiment of the present invention, which is formed using a plurality of tubular fuel cells 150 and current collecting members 32 and 34. With the exceptions of replacing the plurality of tubular fuel cells 50 and the current collecting members 22 and 24 with the plurality of tubular fuel cells 150 and the current collecting members 32 and 34 respectively, the structure of this embodiment is substantially the same as the structure of the tubular fuel cell module 100 shown in FIG. 1.

Figure 10:
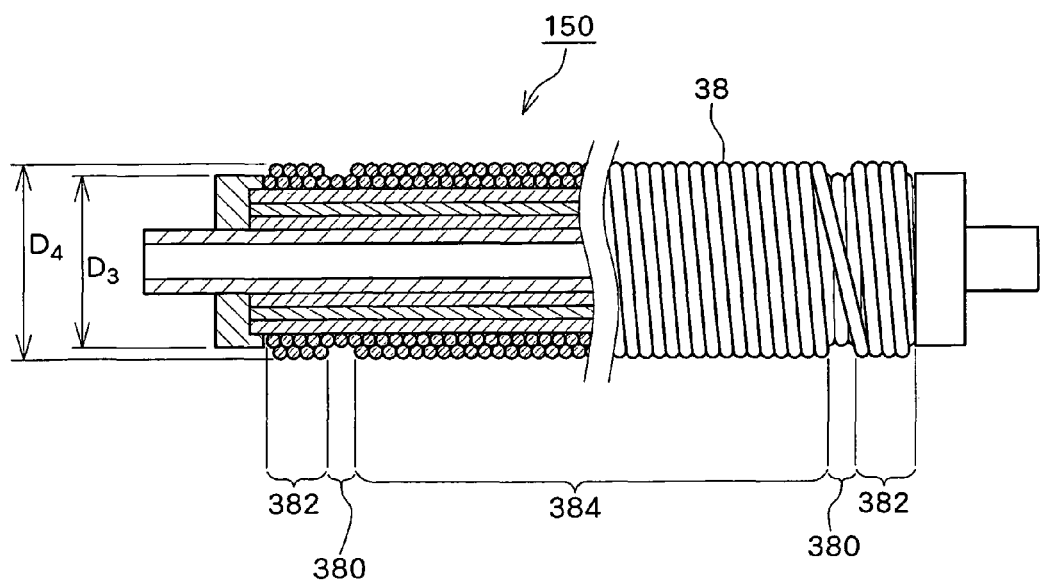
FIG. 10 is a diagram showing an outline of the structure of a tubular fuel cell shown in FIG. 9.

FIG. 10 is a diagram showing an outline of the structure of the tubular fuel cell 150 shown in FIG. 9, wherein the left-hand side of the diagram shows a cross-sectional view along the lengthwise direction of the tube of the tubular fuel cell 150. With the exception of replacing the external coil 28 with an external coil 38, the structure of the tubular fuel cell 150 is substantially the same as the structure of the tubular fuel cell 50 shown in FIGS. 2 and 3.

As shown in FIG. 10, the tubular fuel cell 150 has a tightly wound external coil 38 that has first coil sections 380 and second coil sections 382 and 384, and these second coil sections 382 and 384 are positioned so as to sandwich the first coil sections 380. By altering the number of winds of the external coil 38 within these first coil sections 380 and second coil sections 382 and 384, first coil sections 380 with a first outer peripheral diameter $D_3$ and second coil sections 382 and 384 with a second outer peripheral diameter $D_4$ that is larger than the first outer peripheral diameter $D_3$ are formed. The tubular fuel cell module 200 can be formed by fitting together the first coil sections 380 of the tubular fuel cells 150, and openings 36 formed with a predetermined spacing within the current collecting members 32 and 34. This configuration is particularly advantageous because almost the entire periphery of the edge portions 40 can contact the external coil 38.

The current collecting members 32 and 34 have the same structure as the current collecting members 22 and 24 described in the above embodiment. As shown in FIG. 9, when a tubular fuel cell 150 is fitted within the openings 36 of the current collecting members 32 and 34, an inner peripheral diameter $d_2$ of the opening 36 is slightly larger than the outer peripheral diameter $D_3$ of the first coil sections 380. In a preferred configuration, the inner peripheral diameter $d_2$ is larger than the outer peripheral diameter $D_3$ of the first coil sections 380, but smaller than the outer peripheral diameter $D_4$ of the second coil sections 382 and 384. As a result, the tubular fuel cell 150 is supported in a stable manner relative to the current collecting members 32 and 34.

In this embodiment, the external coil 38 was wound once within the first coil sections 380, but wound twice within the second coil sections 382 and 384, but the present invention is not restricted to this configuration, and for example, in order to further strengthen the fit between the current collecting members 32 and 34 and the tubular fuel cells, an additional wind of the external coil 38 could be provided within a portion of the second coil sections 382 and 384.

In this embodiment of the present invention, examples of ideal materials for the current collecting members 32 and 34 and the external coil 38 include the same materials as those used for the current collecting members 22 and 24 and the external coil 28 shown in FIG. 1. Furthermore, the thickness of the current collecting members 32 and 34 may be set appropriately in a similar manner to that described for the thickness of the current collecting members 22 and 24. Furthermore, although the current collecting members 32 and 34 may be either the same or different, in order to limit the number of components, members of the same material and same shape are preferably used.

In this manner, by inserting a plurality of tubular fuel cells through current collecting members that include a plurality of openings with a predetermined spacing therebetween, and fitting the external coils within the openings in the current collecting members, a plurality of tubular fuel cells can be readily secured to the current collecting members with a predetermined positional relationship maintained between the cells, thereby enabling formation of a module.

Figure 11:
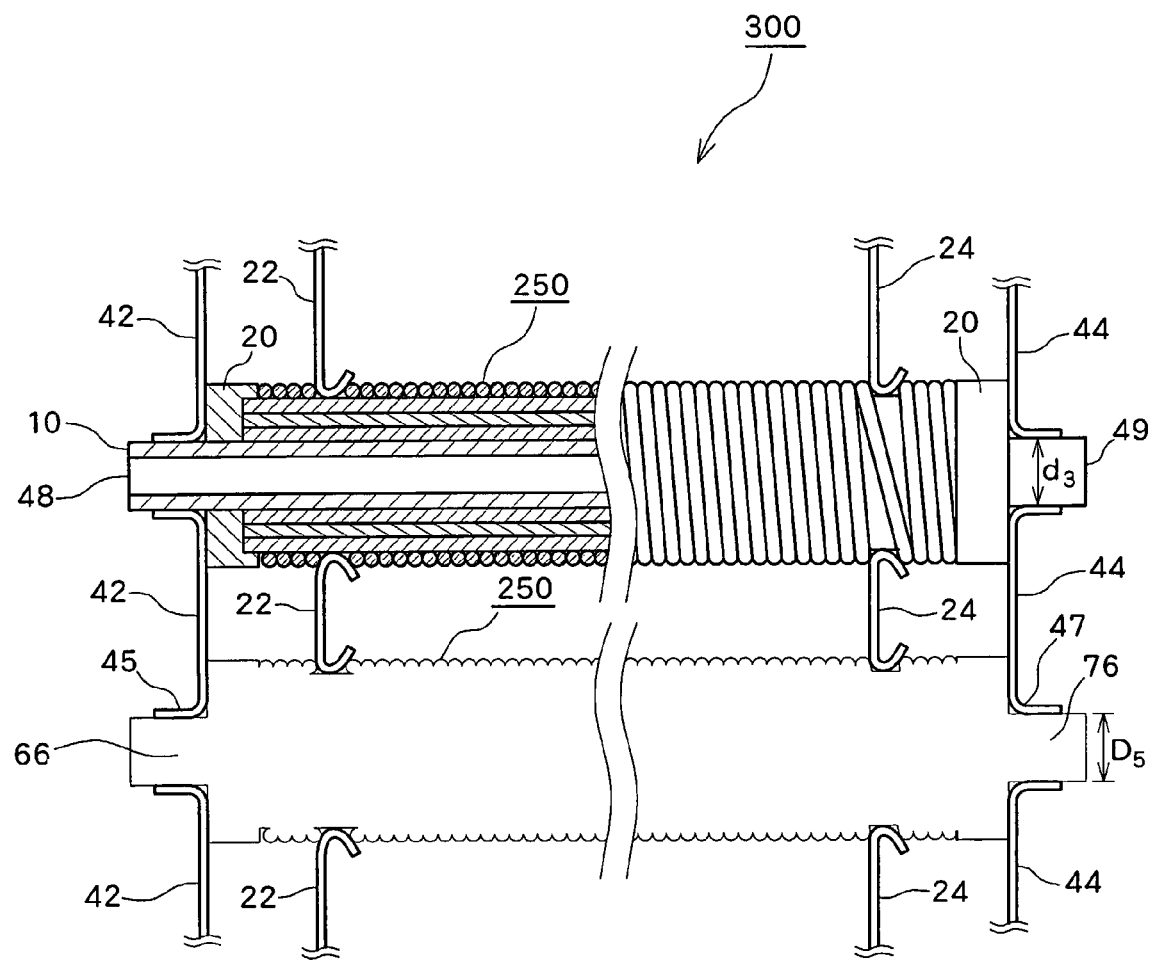
FIG. 11 is a diagram showing an outline of the structure of a tubular fuel cell module 300 according to yet another embodiment of the present invention.

Next is a description of yet another embodiment of the present invention. FIG. 11 is a side view showing an outline of the structure of a tubular fuel cell module 300 according to yet another embodiment of the present invention, which is formed using a plurality of tubular fuel cells 250 and current collecting members 22, 24, 42, and 44. With the exception of adding the current collecting members 42 and 44, the structure of this embodiment is substantially the same as the structure of the tubular fuel cell module 100 shown in FIG. 1.

As shown in FIG. 11, the inner electrode 10 of each tubular fuel cell 250 has tip portions 48 and 49 that are exposed externally, and each tubular fuel cell 250 is secured by inserting the tip portions 48 and 49 into openings 66 and 76 provided at a predetermined spacing within the current collecting members 42 and 44.

Ideal materials for the inner electrode 10 including the tip portions 48 and 49 include gold, platinum, copper, stainless steel, titanium, or alloys containing such metals. In order to reduce the contact resistance, the inner electrodes may also be coated with appropriate gold plating or the like. The thickness of the inner electrode 10 is preferably adjusted appropriately in accordance with the size of the tubular fuel cell 250. For example, the outer peripheral diameter $D_5$ of the inner electrode 10 is preferably set to value within a range from 0.5 to 0.95 times the outer peripheral diameter of the external coil 28 of the tubular fuel cell 250. For example, in those cases where the outer peripheral diameter of the external coil 28 is within a range from approximately several mm to several cm, the outer peripheral diameter $D_5$ of the inner electrode 10 is preferably set within a range from 0.5 to 5.0 mm.

The current collecting members 42 and 44 are formed mainly from a material that exhibits favorable conductivity.

Examples of the material that can be used include gold, platinum, copper, stainless steel, titanium, or alloys containing such metals. Furthermore, the surfaces of the current collecting members 42 and 44 are preferably subjected to plating treatment such as gold plating to further improve the conductivity. Furthermore, although the current collecting members 42 and 44 may be either the same or different, in order to limit the number of components, the same members are preferably used, and using members of the same material as the current collecting members 22 and 24 is even more desirable.

The current collecting members 42 and 44 must also have the necessary rigidity required to enable formation of the tubular fuel cell module 300. Specifically, the thickness of the current collecting members 42 and 44 is preferably adjusted in accordance with factors such as the size, number, and weight of tubular fuel cells that are supported. The thickness of the current collecting members 42 and 44 is preferably adjusted with careful consideration of the balance needed between the rigidity required in the planar portions of the members, and the flexibility required in those portions that curve or bend.

For example, if the outer peripheral diameter of the inner electrode 10 including the tip portions 48 and 49 is approximately 1.0 mm, and the number of tubular fuel cells used within a singe cell module is approximately 10 to 50, then the thickness of the current collecting members 42 and 44 is preferably within a range from 0.1 to 2 times the outer peripheral diameter $D_5$ of the inner electrode 10. For example, if the outer peripheral diameter $D_5$ of the inner electrode 10 is within a range from 1.0 to 3.0 mm, then the thickness of the current collecting members 42 and 44 is preferably within a range from approximately 0.1 to 6 mm.

The current collecting members 42 and 44 are positioned in a parallel arrangement with both members extending perpendicularly from the plane of the paper in FIG. 11. The openings 66 and 76 in the current collecting members 42 and 44 are provided in positions that line up when the current collecting members 42 and 44 are positioned facing one another. By inserting tubular fuel cells 250 through the openings 66 and 76 provided in the current collecting members 42 and 44 in a substantially perpendicular direction relative to the plane of the current collecting members 42 and 44, the fuel cells are supported in a manner in which the tip portions 48 and 49 and edge portions 45 and 47 of the openings 66 and 76 are electrically connected. Accordingly, the electricity generated by each of the tubular fuel cells 250 can be collected. With the current collecting members 42 and 44 of the shapes shown in FIG. 11, if the relative positions of the current collecting members 42 and 44 are determined in advance, then inserting the tubular fuel cells 250 into the openings 66 and 76 can be difficult, and as a result, the current collecting members 42 and 44 are preferably fitted from the sides of the tip portions 48 and 49 respectively.

As shown in FIG. 11, when the tubular fuel cells 250 are inserted into the openings 66 and 76 in the current collecting members 42 and 44, the flexibility of the current collecting members 42 and 44 enables the edge portions 45 and 47 of the openings 66 and 76 to fit tightly around the outer periphery of the inner electrodes 10. As a result, the tubular fuel cells 250 are supported by the edge portions 45 and 47 of the current collecting members 42 and 44 in a manner that is both physically and electrically stable. The current collecting members 42 and 44 may use similar members to the current collecting members 22 and 24, and moreover, insertion portions 46 with the shape shown in FIG. 6(*a*) may be formed in the current collecting members 42 and 44 with a predetermined spacing therebetween, namely, a spacing that ensures that the catalyst layers on the outside of adjacently secured tubular fuel cells 250 do not make contact with each other.

In this embodiment, the current collecting members 42 and 44 may be connected electrically to aid current collection, but care must be taken to ensure no contact and short circuiting occurs with the current collecting members 22 and 24 (32 and 34). Furthermore in this embodiment, the tubular fuel cell module 300 is formed using four current collecting members 22, 24, 42 and 44 to secure and position the tubular fuel cells 250, but only two of these current collecting members are needed to secure and position the tubular fuel cells 250, and for example, the structure could include only the current collecting members 42 and 44. A preferred configuration, however, uses the four current collecting members 22, 24 (32, 34), 42 and 44.

In FIG. 11, the current collecting members 42 and 44 are positioned in close contact with the resin seal 20, but need not necessarily be in such close contact. Furthermore, the current collecting members 42 and 44 are preferably fitted so that the fuel gas or oxidizing gas does not leak through the interface between the edge portions 45 and 47 of the openings 66 and 76, and the tip portions 48 and 49. The tips of the edge portions 45 and 47 are often sharp, and in order to ensure that these tips do not make contact with, and damage or scratch, nearby members not shown in the figures, these tips are preferably designed so as not to protrude beyond the end of the tip portions 48 and 49.

In this manner, by inserting a plurality of tubular fuel cells through current collecting members that include a plurality of openings with a predetermined spacing therebetween, the plurality of tubular fuel cells can be readily secured to the current collecting members with a predetermined positional relationship maintained between the cells, thereby enabling formation of a multiple cell module.

The present invention can be used favorably in cases where a tubular fuel cell module is formed using a plurality of tubular fuel cells. Generally, a tubular shape refers to a circular cylindrical shape that is hollow, but in this description, refers simply to a cylindrical shape, which may be a polygonal cylinder such as a triangular cylinder, square cylinder, pentagonal cylinder or hexagonal cylinder, or an elliptical cylinder, but is typically a circular cylinder.

As described above, according to embodiments of the present invention or modifications thereof, a tubular fuel cell module that uses a plurality of tubular fuel cells can be formed with ease.

The invention claimed is:

1. A tubular fuel cell module, comprising:
 a plurality of tubular fuel cells, which each comprise:
  a cylindrically shaped inner electrode that exhibits conductivity,
  a first catalyst layer, an electrolyte layer, and a second catalyst layer laminated sequentially to an outer peripheral surface of the inner electrode, and
  an external coil that exhibits conductivity and is wound around an outer peripheral surface of the second catalyst layer in such a manner that a first coil section with a loose winding pitch is sandwiched between second coil sections with a tight winding pitch; and
 a current collecting member that exhibits conductivity and is provided with a plurality of openings into which the tubular fuel cells can be inserted, wherein
 the first coil sections and the openings fit together.

2. The tubular fuel cell module according to claim 1, wherein
 an inner peripheral diameter of the openings when the tubular fuel cells have been fitted within the openings is larger than an outer peripheral diameter of the second catalyst layer, but smaller than an outer peripheral diameter of the second coil sections.

3. The tubular fuel cell module according to claim 1, wherein
the current collecting member comprises insertion portions having a plurality of slits that extend radially outward in an in-plane direction from a central portion, and
the tubular fuel cells are inserted in a manner that causes the plurality of slits of the insertion portions to curve or bend, thereby securing the tubular fuel cells to the current collecting member.

4. The tubular fuel cell module according to claim 3, wherein
by inserting the tubular fuel cells, the plurality of slits provided in the insertion portions undergo deformation, thereby forming the openings.

5. The tubular fuel cell module according to claim 3, wherein
the insertion portions are provided in such a manner that at least the second catalyst layers of the plurality of tubular fuel cells do not contact each other.

6. A tubular fuel cell module, comprising:
a plurality of tubular fuel cells, which each comprise:
   a cylindrically shaped inner electrode that exhibits conductivity,
   a first catalyst layer, an electrolyte layer, and a second catalyst layer laminated sequentially to an outer peripheral surface of the inner electrode, and
   an external coil that exhibits conductivity and is wound around an outer peripheral surface of the second catalyst layer in such a manner that a first coil section with a first outer peripheral diameter is sandwiched between second coil sections with a second outer peripheral diameter that is larger than the first outer peripheral diameter; and
a current collecting member that exhibits conductivity and is provided with a plurality of openings into which the tubular fuel cells can be inserted, wherein
the first coil sections and the openings fit together.

7. The tubular fuel cell module according to claim 6, wherein
an inner peripheral diameter of the openings when the tubular fuel cells have been fitted within the openings is larger than an outer peripheral diameter of the second catalyst layer, but smaller than an outer peripheral diameter of the second coil sections.

8. The tubular fuel cell module according to claim 6, wherein
the current collecting member comprises insertion portions having a plurality of slits that extend radially outward in an in-plane direction from a central portion, and
the tubular fuel cells are inserted in a manner that causes the plurality of slits of the insertion portions to curve or bend, thereby securing the tubular fuel cells to the current collecting member.

9. The tubular fuel cell module according to claim 8, wherein
by inserting the tubular fuel cells, the plurality of slits provided in the insertion portions undergo deformation, thereby forming the openings.

10. The tubular fuel cell module according to claim 8, wherein
the insertion portions are provided in such a manner that at least the second catalyst layers of the plurality of tubular fuel cells do not contact each other.

* * * * *